United States Patent [19]

Wu

[11] Patent Number: 5,281,065
[45] Date of Patent: Jan. 25, 1994

[54] LEAKPROOF WASHER

[76] Inventor: Szu-Hsien Wu, No. 55, Hsueh-Tang Rd., Jen-Mei Tsuen, Niao-Sung Hsiang, Kaohsiung Hsien, Taiwan

[21] Appl. No.: 57,676

[22] Filed: May 5, 1993

[51] Int. Cl.$^5$ ............ F16B 39/00; F16B 43/02
[52] U.S. Cl. .................... 411/258; 411/82; 411/369; 411/542
[58] Field of Search .............. 411/82, 258, 369, 542, 411/930

[56] References Cited

U.S. PATENT DOCUMENTS

| | | | |
|---|---|---|---|
| 2,666,354 | 1/1954 | Dim et al. | 411/258 |
| 3,066,568 | 12/1962 | Armour | 411/542 X |
| 4,312,616 | 1/1982 | Waller et al. | 411/542 X |
| 5,156,509 | 10/1992 | Wu | 411/542 X |

Primary Examiner—Neill R. Wilson
Attorney, Agent, or Firm—Harness, Dickey & Pierce

[57] ABSTRACT

A leakproof washer includes a resilient annular base and a rupturable annular capsule secured on a top face of the annular base. The base and the capsule have inner peripheral walls which cooperatively confine an axial through opening. The capsule contains a hardening agent therein.

2 Claims, 3 Drawing Sheets

LEAKPROOF WASHER

BACKGROUND OF THE INVENTION

1. Field of the Invention

The invention relates to a washer, more particularly to an improved leakproof washer.

2. Description of the Related Art

FIG. 1 illustrates a conventional washer (2) when incorporated on a screw fastener (1). The washer (2) is a resilient annular member with a predetermined thickness and serves to insure tightness and prevent leakage. In use, the washer (2) is sleeved on a threaded shank (11) of the screw fastener (1). When the screw fastener (1) is driven into a member (3), as shown in FIG. 2, the washer (2) is compressed such that the thickness thereof is reduced, while the diameter of the same is increased. The washer (2) is provided tightly between the member (3) and the head portion (12) of the screw fastener (1), thereby enabling the washer (2) to prevent water from leaking into the member (3) via the screw fastener (1). The washer (2) is indispensable in the construction industry especially when it is necessary to provide the screw fastener (1) with waterproofing capabilities. However, deformation and cracking of the washer (2) can occur after prolonged exposure of the latter to rain and sunshine, thereby preventing the washer (2) from accomplishing its purpose. Referring once more to FIG. 2, after the screw fastener (1) has been driven into the member (3) so as to force the washer (2) tightly against the latter, the washer (2) is unable to seal a clearance (D) formed between two adjacent screw threads (11) of the threaded shank (11). Therefore, when the washer (2) cracks and deforms, rain water can easily leak into the member (3) via the clearance (D). The washer (2) is thus unable to accomplish its purpose, thereby resulting in some construction problems.

Since the conventional washer (2) is unable to provide adequate protection against leakage, it has been known to provide a hardening agent (such as silicone) to enclose the head portion (12) of the screw fastener (1). The hardening agent cures upon contact with air and prevents leakage of water into the member (3). However, application of the hardening agent requires additional manpower, thereby increasing the labor costs incurred and prolonging the construction period.

SUMMARY OF THE INVENTION

Therefore, the objective of the present invention is to provide an improved leakproof washer construction which has a rupturable annular capsule that contains a hardening agent therein and that releases the hardening agent when compressed in order to provide a screw fastener with adequate waterproofing capabilities.

Accordingly, the leakproof washer of the present invention comprises a resilient annular base and a rupturable annular capsule secured on a top face of the annular base. The base and the capsule have inner peripheral walls which cooperatively confine an axial through opening. The capsule contains a hardening agent therein. When a screw fastener which incorporates the leakproof washer is driven into a member, the base of the washer is pressed tightly against the member. The capsule ruptures to release the hardening agent, thereby insuring that water cannot flow into the member via the screw fastener.

BRIEF DESCRIPTION OF THE DRAWINGS

Other features and advantages of the present invention will become apparent in the following detailed description of the preferred embodiment, with reference to the accompanying drawings, of which.

DETAILED DESCRIPTION OF THE PREFERRED EMBODIMENT

Figure 2:
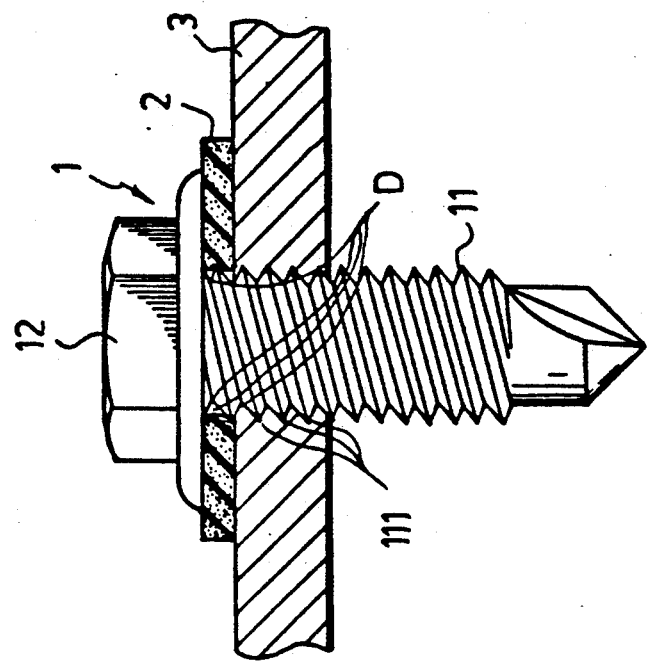
FIG. 2 illustrates the conventional washer when the screw fastener is driven into a member.
Figure 1:
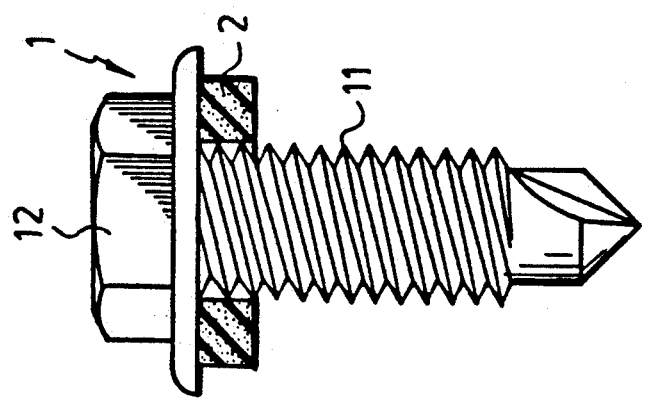
FIG. 1 is a sectional view of a conventional washer that is incorporated on a screw fastener.
Figure 4:
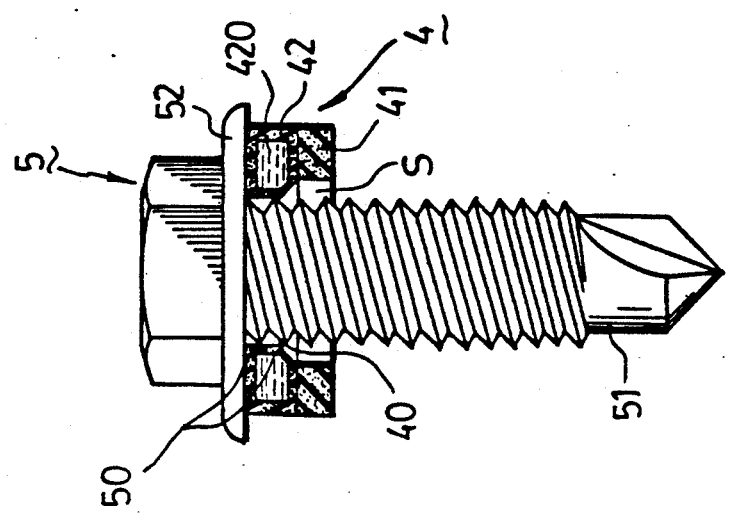
FIG. 4 illustrates the preferred embodiment when incorporated on a screw fastener.
Figure 3:
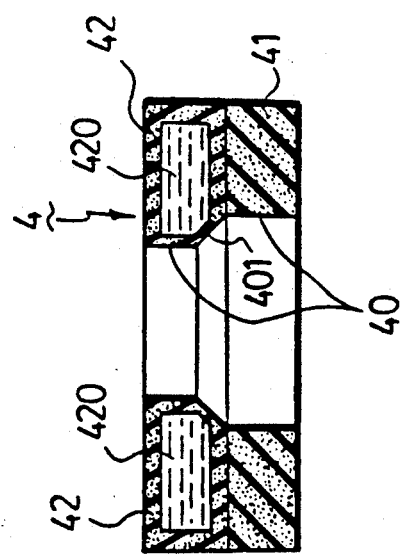
FIG. 3 is a sectional view of the preferred embodiment of a leakproof washer according to the present invention.
Figure 5:
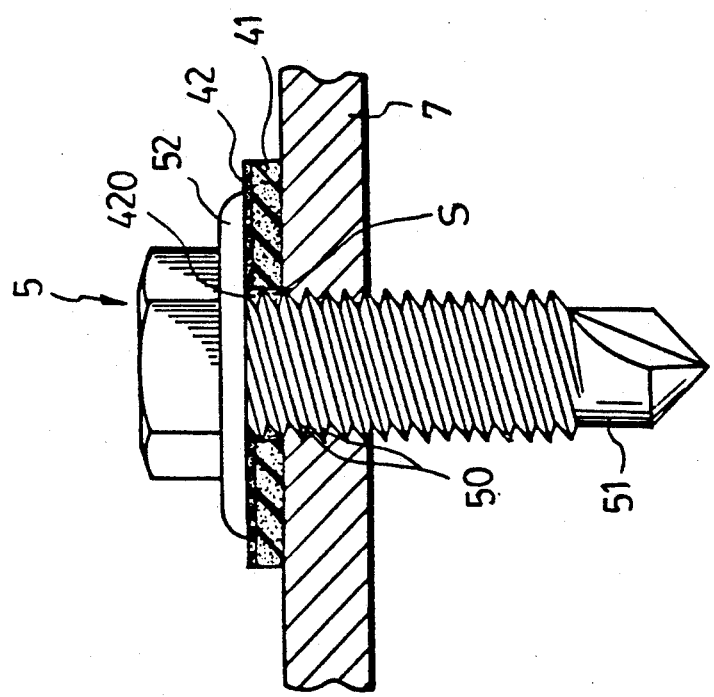
FIG. 5 illustrates the preferred embodiment when the screw fastener is driven into a member.

Referring to FIG. 3, the preferred embodiment of a leakproof washer (4) according to the present invention is shown to comprise a resilient annular base (41) and a rupturable annular capsule (42) secured on a top face of the annular base (41). The base (41) and the capsule (42) have inner peripheral walls which cooperatively confine an axial through opening (40) to permit the threaded shank of a screw fastener to extend therethrough. The base (41) is preferably made of resilient polyvinyl chloride (PVC) plastic, EPDM or neoprene, while the capsule (42) is preferably made of a thin plastic material (such as PVC). The inner diameter of the capsule (42) is smaller than that of the base (41). The inner peripheral wall of the capsule (42) has an inclined thinned portion (401) which extends upwardly and radially inward from the inner peripheral wall of the base (41). The capsule (42) contains a hardening agent (420), such as quick-drying silicone, therein. FIG. 4 illustrates the preferred embodiment when incorporated on a screw fastener (5). The threaded shank (51) of the screw fastener (5) extends through the through opening (40) in the washer (4). The capsule (42) is disposed between the base (41) and the head portion (52) of the screw fastener (5). A clearance (S) is formed between the inner peripheral wall of the base (41) and the threaded shank (51). Referring to FIG. 5, as the screw fastener (5) is driven into a member (7), such as a steel plate, the head portion (52) presses the capsule (42) toward the base (41). The capsule (42) eventually ruptures at the thinned portion (401) due to compression of the capsule (42), thereby releasing the hardening agent (420) into the clearance (S). The hardening agent (420) encloses the portion of the threaded shank (51) in the through opening (40) and flows into small gaps that are formed between the screw fastener (5) and the member (7). The hardening agent (420) cures upon contact with air, thereby preventing rain water from leaking into the member (7) via the screw fastener (5). Furthermore, since the head portion (52) of the screw fastener (5) forces the base (41) tightly against the member (7), the washer (4) of the present invention can provide double protection against leakage.

The characterizing features of the present invention are as follows:

1. The washer (4) of the present invention can guard effectively against leakage. When the screw fastener (5) is driven into the member (7), the base (41) of the washer (4) is pressed tightly against the member (7).

The capsule (42) ruptures to release the hardening agent (420) so as to enclose the portion of the threaded shank (51) which extends into the washer (4). The hardening agent (420) cures upon contact with air, thereby insuring that water cannot flow into the member (7) via the screw fastener (5) even after wearing and deformation of the base (41) has occurred.

2. The washer (4) incorporates the hardening agent (420) therein. Therefore, application of the hardening agent (420) is simultaneous with driving of the screw fastener (5). Since no additional manpower is required, no increase in the labor costs is incurred and the construction period is not prolonged.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A leakproof washer comprising a resilient annular base and a rupturable annular capsule secured on a top face of said annular base, said base and said capsule having inner peripheral walls which cooperatively confine an axial through opening, said capsule containing a hardening agent therein; and includes an inner diameter which is smaller than that of said base, said capsule having an inner peripheral wall having a thinned portion and said thinned portion is inclined and extends upwardly and radially inwardly from said inner peripheral wall of said base.

2. The leakproof washer as claimed in claim 1, wherein said hardening agent is silicone.

* * * * *